A. C. NORCROSS,
Assignor to H. D. TRASK.
Automatic Heat-Regulator for Furnaces.
No. 8,582. Reissued Feb. 18, 1879.
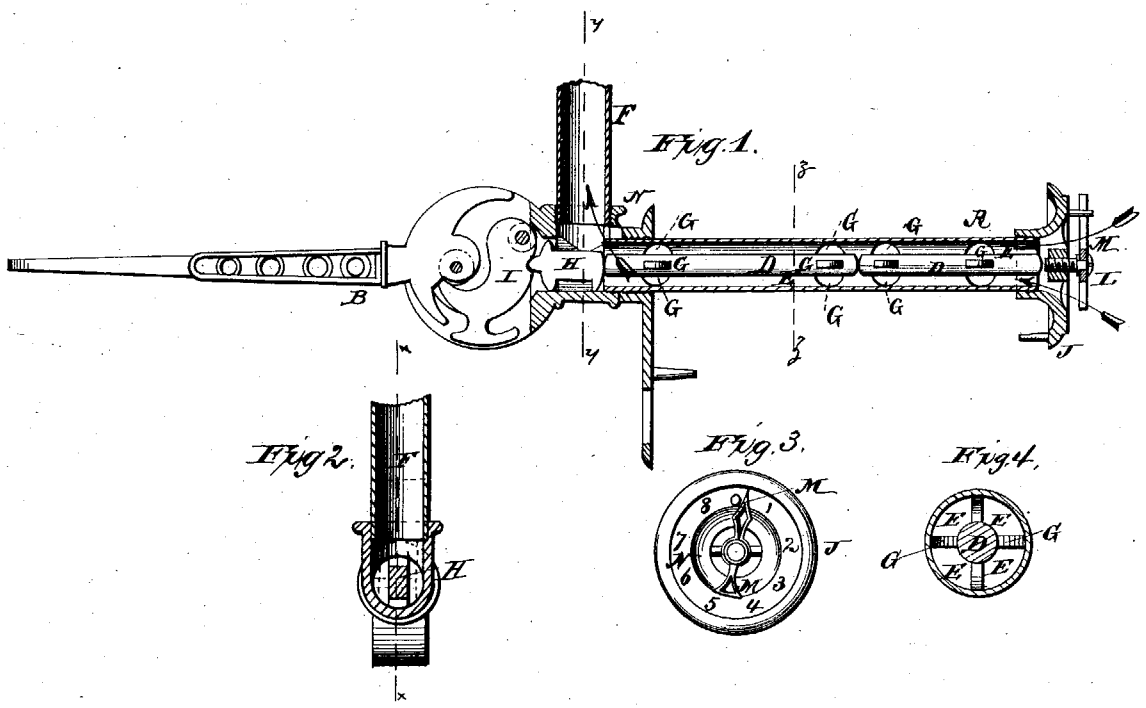
WITNESSES
F. L. Durand
H. A. Toulmin.
By
INVENTOR
Alvin C. Norcross
Alexander Thacher
ATTORNEYS

UNITED STATES PATENT OFFICE

ALVIN C. NORCROSS, OF BOSTON, ASSIGNOR TO HENRY D. TRASK, OF BROOKFIELD, MASSACHUSETTS.

IMPROVEMENT IN AUTOMATIC HEAT-REGULATORS FOR FURNACES.

Specification forming part of Letters Patent No. 175,375, dated March 28, 1876; Reissue No. 8,582, dated February 18, 1879; application filed January 14, 1879.

*To all whom it may concern:*

Be it known that I, ALVIN C. NORCROSS, of Boston, in the county of Suffolk and State of Massachusetts, have invented certain new and useful Improvements in Automatic Heat-Regulators for Furnaces; and I do hereby declare that the following is a full, clear, and exact description thereof, reference being had to the accompanying drawings, and to the letters of reference marked thereon, which form a part of this specification.

My invention relates to automatic regulators for furnaces consisting of one expanding and contracting part and another non-expanding, or comparatively non-expanding, part, so placed in the furnace as to be subject to the heat of the furnace, for working the regulator by the expanding and contracting part as the heat rises and falls; and the invention consists of the part which is not required to expand, located within a tubular expanding part, having provision for a current of air to flow through it from outside of the furnace, to keep the other part from heating, the object being to enable a metal rod of ordinary expanding and contracting qualities to be used where a substance of non-expanding properties has been heretofore required. The air-current also causes a quicker action of the contracting part when the heat of the furnace falls, and thus makes the regulator more sensitive.

The air may be taken from outside of the building to utilize the variations of the exterior temperature, to facilitate the responsive action of the regulator to the requirements of colder or warmer weather.

My invention also consists in the rod and radial flanges or studs applied thereto for centering the rod in the tube, so that the current of air passing through the tube will circulate all around it.

Figure 1 is a longitudinal sectional elevation of a regulator embodying my invention, the section being taken on line *x x*. Fig. 2 is a transverse section on line *y y*, Fig. 1. Fig. 3 is a front elevation of the indicator of the regulator, and Fig. 4 is a transverse section on line *z z*.

A represents the expanding and contracting tube for working the regulating-lever B with the variations of heat. D is the inclosed rod, which is required not to expand. This rod is arranged inside of the tube A, which is made enough larger than the rod to afford ample space for a current of air wholly surrounding the rod, and said tube is provided with inlet-openings E and outlet F to effect the circulation, said inlet and outlet being in communication with the exterior atmosphere, while the rod and the tube are mostly located within the heating-chamber of the furnace.

The outlet F may be arranged in any suitable manner, and may run in any direction, and connect with the chimney.

In order to maintain the rod in the center of the tube, so that it shall be exposed alike on all sides to the air, I provide the rod with radial studs or flanges G, which keep it in the middle, as shown.

In practice, the inclosed rod will, when arranged to push, be made of a number of short sections of different lengths, to facilitate the fitting of the regulators to furnaces of different sizes without having to cut the rods when putting them up; but when made to pull it will be made of one piece.

J is a cap for connection to the outside of the furnace-wall, for the support of the tube D, the air-inlets being made in it, and it supports an adjusting-screw, L, for setting the rod to alter the regulator, as may be required from time to time. This screw forms a part of the rod virtually in operation. It also carries a pointer or index-finger, M, in connection with the dial N, by which to set the screw to any required position. That portion of the screw which carries the finger or index M is made square, hexagonal, or octagonal, so that the index can easily be adjusted as required.

N′ is a keeper for the support of the tube at the other side of the furnace.

The regulator is arranged horizontally across the hot-air chamber of the furnace, extending through the walls at the cap and the keeper.

I am aware that a rod inclosed in a tube, and operating a damper through the interposition of a suitable lever or levers by the contraction and expansion of one of the parts is not new, and I do not claim such, broadly, as my invention.

Having thus fully described my invention, what I claim as new, and desire to secure by Letters Patent, is—

1. The expansible tube passing through the stove or furnace, and having openings at both ends for the passage of a current of outside air, for the purposes set forth.

2. The regulating rod or rods surrounded by a current of air admitted from the outside at one end of the exterior tube, and passing through the opposite end to any point desired, as set forth.

3. The combination of the exterior tube, open at both ends to admit of a current of air passing through it, and an interior non-expanding rod, or a rod of less expansibility, for the purposes set forth.

4. The regulating-rod made in sections, for the purposes set forth.

5. The combination of the exterior tube, the interior rod, intermediate air-chamber, and an outlet-tube, forming a draft-flue, as and for the purpose specified.

6. The regulating-rod made in one or more pieces, having radial studs, in combination with the inclosing-tube, substantially as specified.

In testimony that I claim the foregoing I have hereunto set my hand this 24th day of December, 1878.

ALVIN C. NORCROSS.

Witnesses:
C. L. EVERT,
F. L. OURAND.